(12) United States Patent
Le et al.

(10) Patent No.: US 6,255,799 B1
(45) Date of Patent: Jul. 3, 2001

(54) RECHARGEABLE SHOE

(75) Inventors: Binh Q. Le, Vienna, VA (US); Ark L. Lew, Ellicott City, MD (US); Paul D. Schwartz, Arnold, MD (US); Albert C. Sadilek, Elkridge, MD (US); Joseph J. Suter, Ellicott City, MD (US); Jason E. Jenkins, Columbia, MD (US); Sharon X. Ling, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/474,515

(22) Filed: Dec. 29, 1999

Related U.S. Application Data
(60) Provisional application No. 60/114,241, filed on Dec. 30, 1998.

(51) Int. Cl.[7] .............................. H02J 7/00; H02K 5/00; A43B 7/02
(52) U.S. Cl. ................. 320/107; 320/123; 320/DIG. 34; 322/1; 36/3 B; 219/211
(58) Field of Search ................... 320/107, 112, 320/123, DIG. 34; 322/1, 4, 100; 36/3 B, 2.6; 219/211

(56) References Cited

U.S. PATENT DOCUMENTS

| | | | |
|---|---|---|---|
| 1,272,931 | * | 7/1918 | Etheridge .............................. 219/211 |
| 1,506,282 | * | 8/1924 | Barbieri ............................... 310/75 B |
| 3,534,391 | * | 10/1970 | Bauer et al. ........................... 219/211 |
| 4,674,199 | * | 6/1987 | Lakie ...................................... 36/2.6 |
| 4,782,602 | * | 11/1988 | Lakie ...................................... 36/2.6 |
| 4,845,338 | * | 7/1989 | Laike ................................... 219/211 |
| 4,941,271 | * | 7/1990 | Lakie ...................................... 36/2.6 |
| 5,077,515 | * | 12/1991 | St. Arnauld ............................... 322/4 |
| 5,167,082 | * | 12/1992 | Chen ...................................... 36/2.6 |
| 5,367,788 | * | 11/1994 | Chen ...................................... 36/3 B |
| 5,495,682 | * | 3/1996 | Chen ...................................... 36/2.6 |

* cited by examiner

Primary Examiner—Peter S. Wong
Assistant Examiner—Gregory J Toatley, Jr.
(74) Attorney, Agent, or Firm—Francis A. Cooch

(57) ABSTRACT

The invention comprises a means for generating energy while walking or running for storage in a rechargeable battery. One embodiment uses lever arm movement in the heel of a shoe resulting from normal walking or running to generate energy from a built-in generator. The linear or rotational motion of the lever arm engages the circular gear assembly and turns the generator/motor/turbine, thus generating power. The second embodiment uses fluid reservoirs embedded in the shoes. Pressure changes resulting from normal walking or running moves the fluid through a narrow channel connecting two reservoirs, thus generating power by rotating a flywheel and an attached motor/generator/turbine in the middle of the channel. Secondary (rechargeable) batteries are incorporated into the invention either in an integrated form or as an add-on design. Additional features include a digital diagnostic data output, which would serves as a "fuel gauge" for the secondary batteries, and a smart charging circuit that efficiently controls battery charging from a generator output that varies with step rate and force.

18 Claims, 4 Drawing Sheets

RECHARGEABLE SHOE

CROSS-REFERENCE TO RELATED APPLICATION

This application claims the benefit of prior filed co-pending U.S. Provisional Application Serial. No. 60/114,241, filed Dec. 30, 1998, which is incorporated herein by reference.

STATEMENT OF GOVERNMENTAL INTEREST

This invention was made with Government support under Contract No. FA8002-96-C-0301 awarded by the Department of the Air Force. The Government has certain rights in the invention.

BACKGROUND OF THE INVENTION

Field of the Invention

The invention relates to apparatus for generating, managing, storing and converting power and, more specifically, is an apparatus for accomplishing one or more of the above functions that fits in a shoe and permits the generation of power while walking or running. 2. Description of the Related Art U.S. Pat. No. 1,506,282 to Barbieri presents a design of an electric shoe with internal generator. In Barbieri's design, mechanical movements of the heel, using a rack and pinion technique, activate the generator.

U.S. Pat. No. 4,674,199 to Lakic presents a design with a generator located within a shoe activated during walking or running by mechanical means. In Lakic's design, a sleeve with spiral grooves converts a linear motion of a piston to a circular motion, and in turn activates a gear mechanism to generate energy to warm the shoe sole. Lakic's invention is similar to Barbieri's design in a general sense of using a rotational movement of a gear set to generate power with a built-in generator. However, the detailed technique for converting a linear motion of the heel to a circular motion of the gear train is different from Barbieri's invention.

U.S. Pat. Nos. 4,845,338 and 4,782,602 to Lakic present further improvements to Lakic's earlier design. The linear motion of a piston is again converted into a circular motion, which in turn activates a gear mechanism to generate power. U.S. Pat. No. 4,845,338 includes an optional feature of a rechargeable battery.

U.S. Pat. No. 3,534,391 to Bauer also illustrates a mechanically driven motor generator adapted to provide electrical energy to a shoe heating means. This device is not self-contained in the heel of a shoe. It is attached to the back of a ski boot and is activated by means of a pulling force created during skiing. The design of the generator is similar to Barbieri's and Lakic's inventions.

U.S. Pat. No. 1,272,931 to Etheridge is of general interest for its teaching of an air pump incorporated into the heel of a shoe as part of a shoe heating device. In this system, electrical energy is not generated. Heat is obtained by compressing air in cylinders within the heel and discharging it into a hollow insole.

U.S. Pat. No. 4,736,540 to Lakic illustrates an improvement on Etheridge's invention. Lakic's invention uses an air pump within the shoe to heat the air in a quasi-Carnot cycle.

U.S. Pat. No. 4,941,271 to Lakic illustrates a bellows style air pump incorporated in the sole of the boot to circulate the heat generated by mechanical friction.

U.S. Pat. No. 5,367,788 to Chen is of general interest for its teaching relating to pumping air from a toe section to a heel section of a shoe. The reference is of further interest for its disclosure of the use of PN junctions to create electrical energy for driving a temperature modifying means. In this instance the temperature modifying means is a cooling apparatus rather than a heating apparatus.

In the previous inventions, a sliding post is used to convert the linear motion of the heel to the circular movement of a gear set, thus powering a generator. However, designs that use a sliding post are highly dependent on a large movement of the heel to be able to generate adequate power. A design is needed that can generate higher torque and thus higher movement than the previous inventions. Additional improvements would be a digital diagnostic data output, and a smart charging circuit that optimizes battery charge management. Also, while some previous inventions do incorporate air pumps to warm or cool the shoe, a pneumatic system could be incorporated to drive a generator, thus creating electrical power.

SUMMARY OF THE INVENTION

The invention comprises a means for generating energy while walking or running for storage in a rechargeable battery. It may utilize concepts disclosed in U.S. Pat. No. 5,644,207, issued Jul. 1, 1997, and patent application Ser. No. 08/884,714, filed Jun. 30, 1997, which are incorporated herein by reference. One embodiment uses lever arm movement in the heel of a shoe resulting from normal walking or running to generate energy from a built-in generator. The linear or rotational motion of the lever arm engages the circular gear assembly and turns the generator/motor, thus generating power. The second embodiment uses fluid reservoirs embedded in the shoes. Pressure changes resulting from normal walking or running moves the fluid through a narrow channel connecting two reservoirs, thus generating power by rotating a flywheel and an attached motor/generator in the middle of the channel. Secondary (rechargeable) batteries are incorporated into the invention either in an integrated form or as an add-on design. Additional features include a data output, which would serve as a "fuel gauge" for the secondary batteries, and a smart charging circuit that optimizes energy storage efficiency and battery lifetime.

The subject invention has the following unique characteristics:

(1) Converts human motion to power by means of a miniaturized generator using a dual reservoir or lever arm design, a dc motor and a turbine (dual reservoir only), all located in or on the shoe sole.

(2) Provides an advanced battery charger controller that can function with the latest, non-toxic battery chemistries (e.g., all polymer, lithium ion polymer, etc.) and can provide a controlled charge current from a generator output that varies with step rate and force.

(3) Provides a diagnostic data output that describes the state of each battery cell.

DETAILED DESCRIPTION OF THE INVENTION

The motor generator charging system design of the invention uses a miniature motor that will generate power when its shaft rotates. Energy output from the motor is directly related to the torque and the rotational speed of the motor shaft. Movement of the input trigger generates an amplified circular motion of the motor shaft through the gear assembly. When the motor shaft turns, a potential voltage and current at the motor terminals are generated for charging the battery.

Electrical energy from the generator is coupled through a non-dissipative, pulse width modulated battery charge regulator which tracks the instantaneous generator output voltage and produces a constant voltage for charging the lithium ion (or other suitable chemistry) batteries. This topology permits effective and efficient charging of the batteries even though variations in step rate and impact force can result in an extremely wide generator output-voltage range. Since electrical energy can be transferred from the generator to the batteries at efficiencies in excess of 90%, little heat is dissipated in the shoe. Operating the charge control pulse width modulator at high switching frequencies will minimize the size and weight of the electronics. The charge control electronics will be fabricated using advanced chip on board fabrication techniques to further reduce size and weight.

Figure 1:
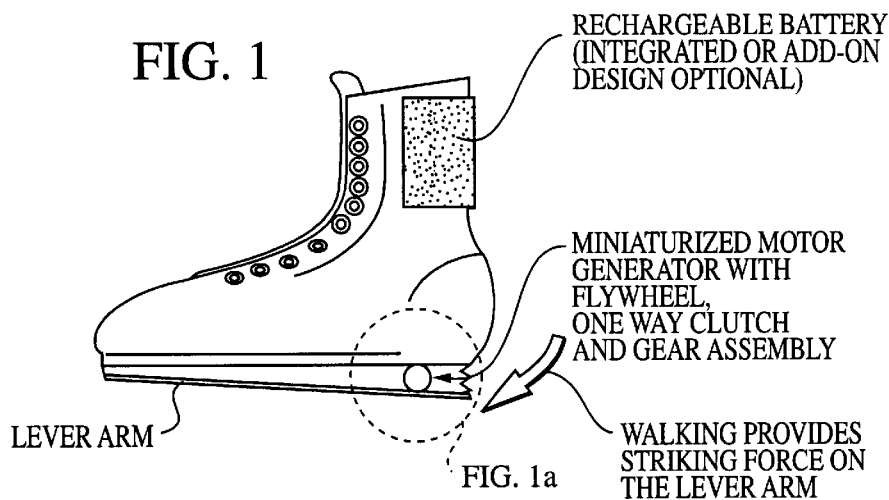
FIG. 1 illustrates the "lever arm" embodiment of the invention.
Figure 1A:
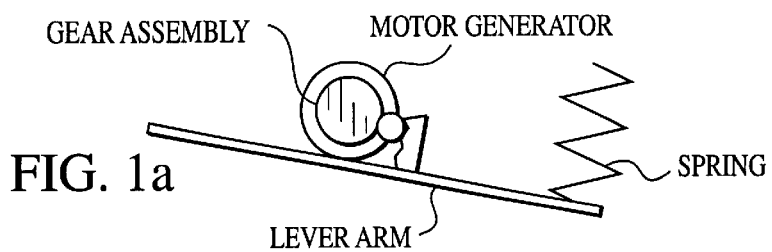

FIG. 1 illustrates the "lever arm" embodiment of the invention wherein a lever arm is integral to the shoe sole. The lever arm has affixed to it means, such as a linear gear, for engaging a circular gear assembly attached to a miniaturized dc motor/generator.

As a person walks, the lever arm deflects, e.g., moves up and down, due to the action of the heel to generate input torque. As a result, the linear gear or other means, engaged with the circular gear assembly, causes the circular gear assembly, and therefore the attached motor/generator to turn and generate power. The motor/generator contains a flywheel with a one-way clutch and gear assembly to assure a continuous generation of electricity. Movement of the gear assembly rotates a flywheel that is directly coupled with the motor/generator.

The energy requirement and the ergonomic factor will determine the gear ratio and the mass of the flywheel. This work is proportional to the force and the displacement of the shoe heel. In the shoe heel design, even though the force will be much higher owing to the high kinetic energy generated by using the human body's weight momentum, the displacement of the shoe heel is limited by the ergonomic factor. Using a displacement of 0.1 in., each shoe can generate up to a conceptual maximum of 4 Watts of power.

Figure 2:
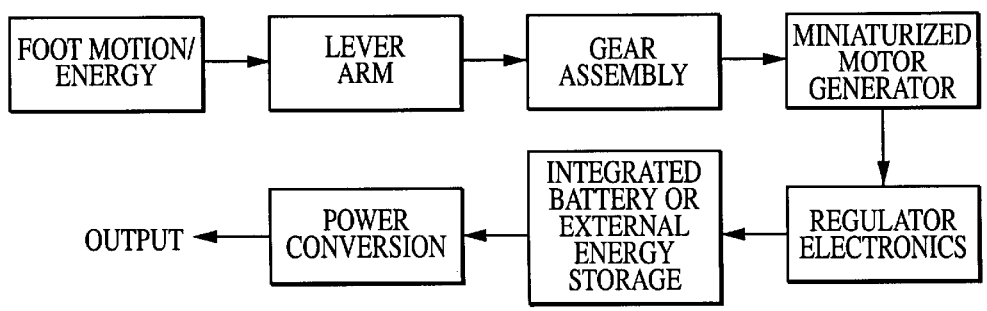
FIG. 2 shows a block diagram of the lever arm rechargeable shoe.
Figure 3A:
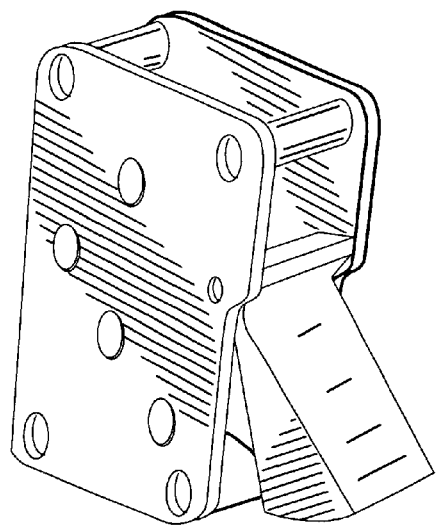
FIG. 3, consisting of FIGS. 3A, 3B and 3C, illustrates a handheld generator prototype design that converts trigger arm movement to power.
Figure 3B:
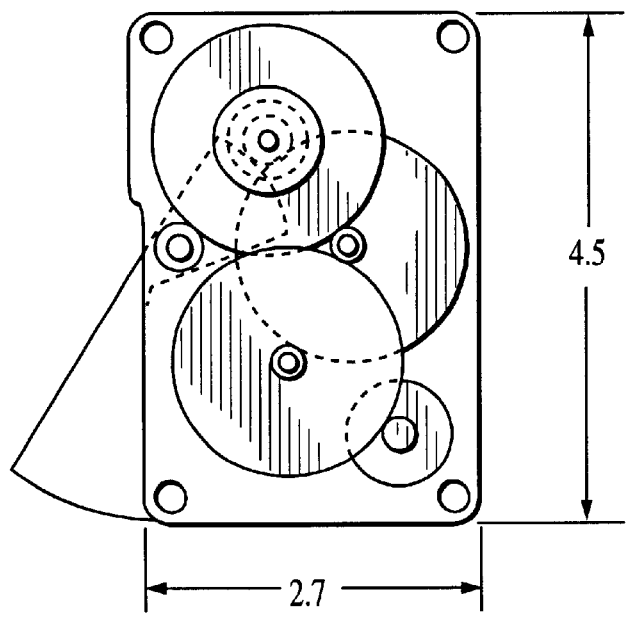
Figure 3C:
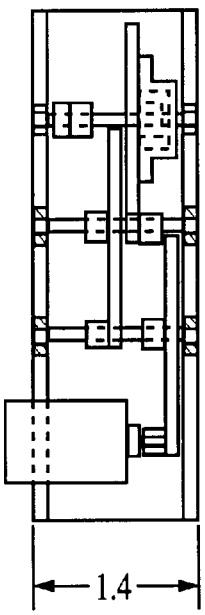

A block diagram of the lever arm embodiment of the invention is shown in FIG. 2. A prototype design of a handheld generator that converts trigger arm, i.e., lever arm, movement into power is shown in FIGS. 3A, 3B and 3C. This handheld device converted 60 pulses per minute squeezing motion to generate a measured average output energy of 1 watt. Custom motor design can significantly increase this energy output.

Figure 4:
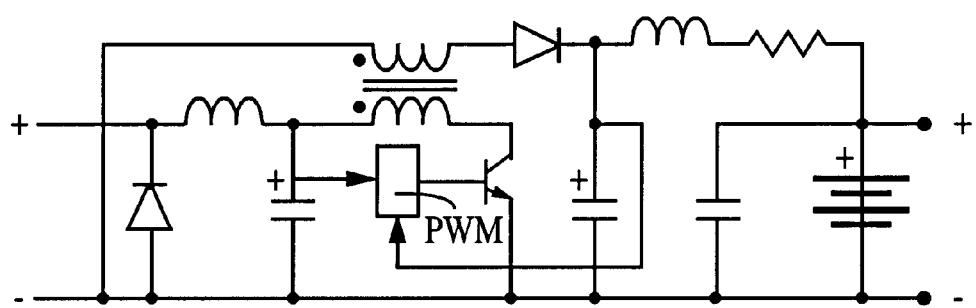
FIG. 4 is a schematic diagram of the charging electronics.

Also located on the shoe, either in an integrated form or as an add-on design, are secondary (rechargeable) batteries, together with power management and battery charge control electronics. An accurate "fuel gauge" feature can be provided with the power management electronics. A circuit diagram of the charging electronics is shown in FIG. 4.

Figure 5:
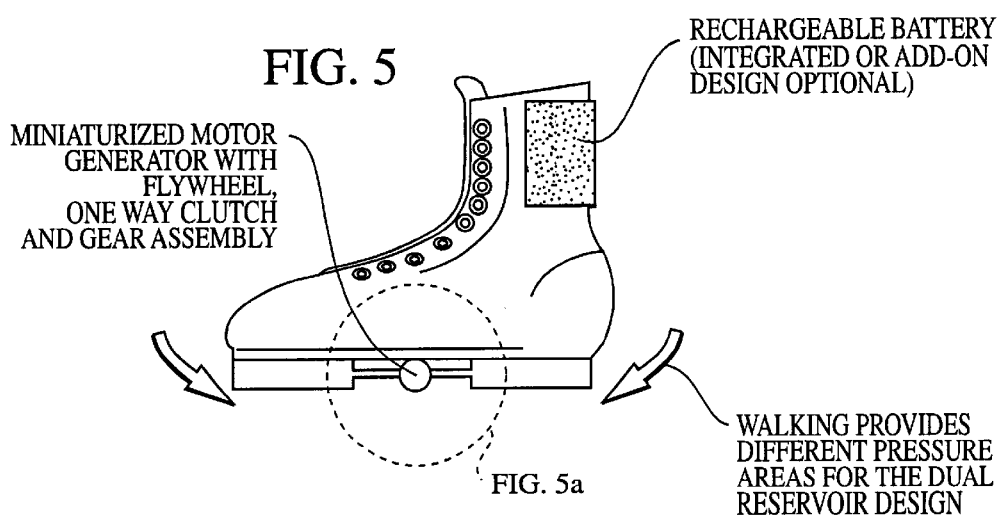
FIG. 5 illustrates the dual reservoir embodiment of the invention.
Figure 5A:
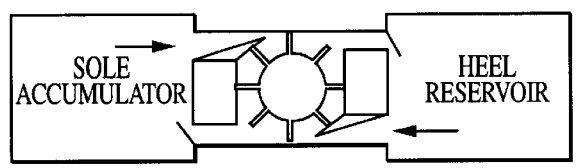

The "dual reservoir" embodiment of the invention is illustrated in FIG. 5. In this embodiment, fluid reservoirs are integral to the sole and heel of the shoe. Walking motion will causes pressure in each reservoir to vary as the weight is shifted on the foot, i.e., weight is first placed on the heel and then, as the foot rolls forward, shifted to the toe before the foot is lifted from the ground to take another step.

As pressure on the fluid changes, fluid will be forced from the heel reservoir to the toe reservoir and back through a narrow reservoir linking passage. In the center of the linking passage is a miniaturized dc motor/generator/turbine with an attached flywheel and a one-way clutch and gear assembly. Located on either side of the flywheel and motor/generator/turbine assembly are two blocks which, in effect, establish two Venturi nozzles/passages, such that when the fluid is forced from one reservoir to the other its speed increases as it passes the flywheel causing the flywheel, and thus, the motor/generator/turbine to turn and generate power. Also, a motor/generator/turbine could be provided in each passage, allowing redundancy in design. Flapper valves would direct the flow into the proper passage/channel to spin the turbine in the preferred direction. The power generator could consist of a dc motor armature, with permanent magnets on the rotor and stator windings in the heel adjacent to the rotor.

If a 180-pound man were standing on size 9 ½ boots, he would generate 20 psi on the approximately 9-square inch heel surface. If this pressure head were converted totally to work, 46.15 ft-lb. of work per lb. mass would be available. Assuming a stroke of 0.1 inch in the reservoir, a volume of 0.9 cubic inches would be displaced into the toe reservoir. At two steps per second, 1.8 cubic inches/second of fluid would be passed through the turbine. Using a fluid with a density of water, 0.065 lb mass per second would drive the turbine, generating a conceptual maximum of 3 ft-lbf/second=4.1 watts of power. The estimated energy output will increase proportionally to the shoe heel displacement. In this calculation, this displacement is limited to 0.1 inch.

Figure 6:
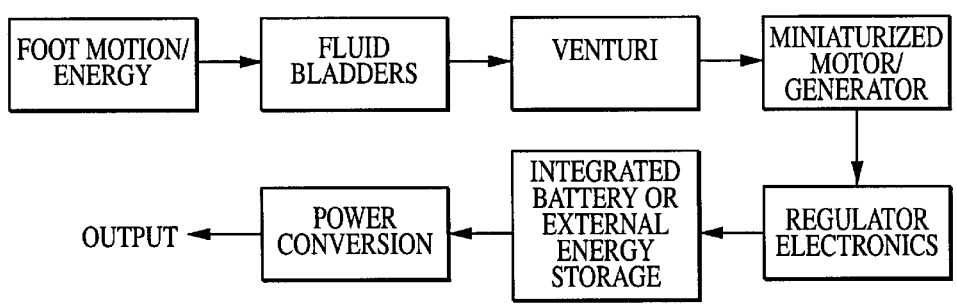
FIG. 6 shows a block diagram of the dual reservoir rechargeable shoe.

Also located in the shoe, as in the lever arm embodiment, are rechargeable batteries and associated power management (with "fuel gauge" feature) and battery charge control electronics (see FIG. 4). A block diagram of the dual reservoir embodiment is shown in FIG. 6.

The subject invention is a unique power conversion, power management, and battery charge control module. The invention can be located in the shoe sole and operated with any type of secondary (rechargeable) battery cells and accommodates any series and parallel cell configuration to allow for any desired value of composite battery voltage and current capacity.

Secondary batteries can be located within the shoe construction. They can be in the form of an add-on component or can be located elsewhere outside of the shoe. A significant benefit of the invention is that energy generated from human movement during walking or running can generate power that can be stored in secondary batteries and managed by a custom electronics circuit design for later usage.

We claim:

1. Apparatus for footwear for generating power as the wearer moves comprising:

a lever attached to the footwear that moves as the wearer moves;

a linear gear attached to the lever;

a gear assembly which is rotated by being engaged by the linear gear; and a generator connected to the gear assembly for generating power as the gear assembly rotates.

2. Apparatus for footwear for generating power as the wearer moves comprising:

a lever attached to the footwear that moves as the wearer moves;

a means for engaging attached to the lever;

a gear assembly which is rotated by being engaged by the means for engaging;

a generator connected to the gear assembly for generating power as the gear assembly rotates;

a flywheel attached to the generator; and a one-way clutch attached to the generator and flywheel;

whereby the flywheel and one-way clutch ensure a continuous generation of electricity.

3. The apparatus as recited in claim 2, the means for engaging comprising a linear gear.

4. The apparatus as recited in claim 3, further comprising a rechargeable battery.

5. The apparatus as recited in claim 4, further comprising means for controlling the charge on the rechargeable battery.

6. The apparatus as recited in claim 5, further comprising means for managing the power in the rechargeable battery.

7. The apparatus as recited in claim 6, the power management means further comprising means for determining the status of charge in the rechargeable battery.

8. An apparatus for footwear for generating power as the wearer moves comprising:

a first reservoir for holding a fluid contained in the heel of the footwear;

a second reservoir for holding a fluid contained in the sole of the footwear and connected to the first reservoir by a passage;

a means for linking the first and second reservoir comprising:

a passage creating means for directing the flow of the fluid between the two reservoirs;

a gear assembly which is rotated by the movement of the fluid from one reservoir to another; and a generator connected to the gear assembly for generating power as the gear assembly rotates.

9. The apparatus as recited in claim 8, wherein the passage creating means establishes a Venturi nozzle such that when the fluid is forced from one reservoir to the other, the speed of the fluid increases as it moves by the gear assembly.

10. The apparatus as recited in claim 9, further comprising:

a flywheel attached to the generator; and a one-way clutch attached to the generator;

whereby the flywheel and one-way clutch ensure the continuous generation of power.

11. The apparatus as recited in claim 10, further comprising a rechargeable battery.

12. The apparatus as recited in claim 11, further comprising a means for controlling the charge on the rechargeable battery.

13. The apparatus as recited in claim 12, further comprising means for managing the power in the rechargeable battery.

14. The apparatus as recited in claim 13, the power management means further comprising means for indicating the amount of charge in the rechargeable battery.

15. A method using footwear for generating power as the wearer moves comprising the steps of:

having a lever attached to the footwear to move as the wearer moves, the lever attached to a linear gear, the linear gear causing a gear assembly to rotate as the linear gear and lever move with the movement of the wearer; and connecting a generator to the gear assembly to rotate as the gear assembly rotates thereby generating power.

16. A method using footwear for generating power as the wearer moves comprising the steps of:

placing a first reservoir and a second reservoir for holding a fluid in the heel and sole, respectively, of the footwear with a passage connecting the two reservoirs; and placing a gear assembly connected to a generator in the passage to rotate as fluid moves between the two reservoirs and by the gear assembly as the wearer moves thereby rotating the generator and generating power.

17. A method using footwear for generating power as the wearer moves comprising the steps of:

having a lever attached to the footwear to move as the wearer moves, the lever attached to a means for engaging, the means for engaging causing a gear assembly to rotate as the means for engaging and lever move with the movement of the wearer;

connecting a generator to the gear assembly to rotate as the gear assembly rotates thereby generating power;

attaching a flywheel to the generator; and attaching a one-way clutch to the generator and the flywheel;

whereby the flywheel and one-way clutch ensure a continuous generation of electricity.

18. The method as recited in claim 17, the means for engaging comprising a linear gear.

* * * * *